United States Patent
Sankaralingam et al.

(10) Patent No.: US 11,042,797 B2
(45) Date of Patent: Jun. 22, 2021

(54) ACCELERATING PARALLEL PROCESSING OF DATA IN A RECURRENT NEURAL NETWORK

(71) Applicant: SimpleMachines Inc., Madison, WI (US)

(72) Inventors: Karthikeyan Sankaralingam, Madison, WI (US); Yunfeng Li, Redmond, WA (US); Vinay Gangadhar, Madison, WI (US); Anthony Nowatzki, Los Angeles, CA (US)

(73) Assignee: SIMPLEMACHINES INC., Madison, WI (US)

( * ) Notice: Subject to any disclaimer, the term of this patent is extended or adjusted under 35 U.S.C. 154(b) by 0 days.

(21) Appl. No.: 16/734,647

(22) Filed: Jan. 6, 2020

(65) Prior Publication Data

US 2020/0218965 A1    Jul. 9, 2020

Related U.S. Application Data

(60) Provisional application No. 62/789,863, filed on Jan. 8, 2019.

(51) Int. Cl.
*G06N 3/063* (2006.01)
*G06N 3/04* (2006.01)

(52) U.S. Cl.
CPC ......... *G06N 3/063* (2013.01); *G06N 3/0445* (2013.01)

(58) Field of Classification Search
None
See application file for complete search history.

(56) References Cited

U.S. PATENT DOCUMENTS

| | | | |
|---|---|---|---|
| 5,495,606 A | * | 2/1996 | Borden ............. G06F 15/17375 |
| 2018/0046914 A1 | * | 2/2018 | Li ........................ G06N 3/082 |
| 2018/0174036 A1 | * | 6/2018 | Han ..................... G06N 3/082 |
| 2018/0189638 A1 | * | 7/2018 | Nurvitadhi .......... G06N 3/0445 |

(Continued)

FOREIGN PATENT DOCUMENTS

| | | |
|---|---|---|
| CN | 107341542 A | 11/2017 |
| CN | 108090560 A | 5/2018 |
| CN | 108268939 A | 7/2018 |

(Continued)

OTHER PUBLICATIONS

Tanomoto, Masakazu, et al. "A cgra-based approach for accelerating convolutional neural networks." 2015 IEEE 9th International Symposium on Embedded Multicore/Many-core Systems-on-Chip. IEEE, 2015. (Year: 2015).*

(Continued)

*Primary Examiner* — Daniel T Pellett

(57) ABSTRACT

According to exemplary embodiments, a method, processor, and system for accelerating a recurrent neural network are presented. A method of accelerating a recurrent neural network may include distributing from a first master core to each of a plurality of processing cores a same relative one or more columns of weight matrix data for each of a plurality of gates in the neural network, broadcasting a current input vector from the first master core to each of the processing cores, and processing each column of weight matrix data in parallel, at each of the respective processing cores.

19 Claims, 6 Drawing Sheets

(56) References Cited

U.S. PATENT DOCUMENTS

2019/0347555 A1* 11/2019 Park .................. G06N 3/063

FOREIGN PATENT DOCUMENTS

| | | |
|---|---|---|
| CN | 108376285 A | 8/2018 |
| KR | 101807961 B1 | 12/2017 |
| WO | 2017185347 A1 | 11/2017 |
| WO | 2018120016 A1 | 7/2018 |

OTHER PUBLICATIONS

Huang, Hantao, et al. "A highly parallel and energy efficient three-dimensional multilayer CMOS-RRAM accelerator for tensorized neural network." IEEE Transactions on Nanotechnology 17.4 (2017): 645-656. (Year: 2017).*

Jiang, Karl, et al. "An efficient parallel implementation of the hidden Markov methods for genomic sequence-search on a massively parallel system." IEEE Transactions on Parallel and Distributed Systems 19.1 (2007): 15-23. (Year: 2007).*

Han, Song, et al. "EIE: efficient inference engine on compressed deep neural network." ACM SIGARCH Computer Architecture News 44.3 (2016): 243-254. (Year: 2016).*

Guan, Yijin, et al. "FPGA-based accelerator for long short-term memory recurrent neural networks." 2017 22nd Asia and South Pacific Design Automation Conference (ASP-DAC). IEEE, 2017. (Year: 2017).*

* cited by examiner

ACCELERATING PARALLEL PROCESSING OF DATA IN A RECURRENT NEURAL NETWORK

CROSS-REFERENCE TO RELATED APPLICATIONS

This application claims the benefit of U.S. Provisional Patent Application No. 62/789,863 filed Jan. 8, 2019, the entire contents of which are incorporated herein by reference.

BACKGROUND OF THE DISCLOSURE

The disclosure relates generally to artificial neural networks. Artificial neural networks (hereinafter, "neural networks") are computing systems that have been inspired by biological neural networks such as in the human brain for learning to recognize and process information, perform tasks, etc. based on examples and information that have been previously received, or "seen". Accordingly, the performance of neural networks may be enhanced by persisting information for continued use in future processes. One known model for persisting information is a recurrent neural network. A recurrent neural network includes feedback for passing information from one step of the neural network to the next. However, the ability to connect and use past information for present processes is limited in typical recurrent neural networks. For example, a typical recurrent neural network may not be able to learn long-term dependencies. Long-term dependencies generally refer to circumstances in which a relatively large gap exists between a time at which relevant information is established and a time at which the relevant information is needed for a process. Typical recurrent neural networks may not be able to learn how to use the past information if the gap becomes too large.

A Long Short-Term Memory neural network (referred to herein as an "LSTM") is a kind of recurrent neural network that is capable of learning long-term dependencies. A typical LSTM and associated algorithm is described further below with respect to FIG. 1. LSTMs capture and leverage temporal behaviors in data by remembering features representing the state of past events. Unfortunately, this temporal dependence (e.g., dependence between processing frames of an input video) at a fine grain may limit the parallelism of LSTMs on parallel hardware that might enhance the speed of LSTMs. LSTMs are known for their lack of significant speedups on parallel hardware due to memory bandwidth bottlenecks and tight phase-dependencies that prevent trivially exploiting parallelism. Accelerating LSTMs remains increasingly important due to their application in a wide range of processes that change over time, for example, speech recognition and video processing.

In general, the LSTM algorithm, as it is carried out for inference (as opposed to training), simply performs a set of four vector-matrix multiplications, then a set of pointwise operations on the resulting vector outputs. For purposes of this disclosure, "pointwise operation" means an algebraic operation on a first set (such as a matrix) of function values with a set of corresponding function values in a second set. In machine-learning lingo, these four matrix-multiplications are referred to as gates, because their goal is to let only the correct/relevant information on to the outputs or next phase of the algorithm. At each step ('i', FIG. 2) of the algorithm, there are neuron activation vectors $C_i$ and $H_i$ (also referred to as candidates and outputs, respectively, or as state vectors) which capture past state, and an input vector $X_i$ which captures the current incoming information to process.

Two basic phases, $C_{i+1}$ and $H_{i+1}$, are carried out to compute the next state vectors. First, $X_i$ is concatenated with $H_i$, and this combined vector is fed through a series of four independent vector-matrix multiplications. These represent four different responsibilities of memory: understanding inputs, forgetting old remembered values, computing new candidate information, and preparing outputs. After matrix multiplication, a series of simple pointwise operations are performed on the four output vectors, the result of which is $C_{i+1}$ and $H_{i+1}$. Since these are pointwise operations, this phase is much shorter and less performance critical. The parallelization challenge is how to carry out the above computations in parallel, e.g., across a multicore system, without causing too much synchronization overhead.

Similar to LSTM, a Gated Recurrent Unit (GRU) neural network (referred to herein as a "GRU") is another type of recurrent neural network that is more apt than a standard recurrent neural network for learning long-term dependencies. The main difference between a GRU and an LSTM is that an additional feedback loop is required for each iteration (or, "timestep") of the algorithm in a GRU. GRUs suffer many of the processing challenges that are described above for LSTMs.

In view of at least the above considerations, a general architecture and technique for parallelizing the inference phase of LSTMs, GRUs, and similar recurrent neural networks is needed.

BRIEF DESCRIPTION OF THE EXEMPLARY EMBODIMENTS

An exemplary embodiment of a method of accelerating a neural network may include distributing from a first master core to each of a plurality of processing cores a same relative one or more columns of weight matrix data for each of a plurality of gates in the neural network and broadcasting a current input vector from the first master core to each of the processing cores. The processing cores may respectively process in parallel the same relative one or more columns of weight matrix data.

An exemplary embodiment of a processor configured for accelerating a recurrent neural network may include a first master core and a plurality of processing cores. The first master core may be configured for distributing to each respective processing core a current input vector and a same relative column of weight matrix data for each of a plurality of gates in the recurrent neural network. The plurality of processing cores may be configured for processing each column of weight matrix data in parallel, at each of the respective processing cores.

An exemplary embodiment of a system configured for accelerating a recurrent neural network may include a host system, a processor including a master core and a plurality of processing cores, a plurality of data vaults, and an interface for maintaining data communication between the processor and the host system. Each data vault may include a local cache and the master core or the processing core to which the local cache is assigned. Each vault may be assigned to a contiguous region of an addressable storage space of the host system, and the contiguous region of the addressable storage space for each vault is stored (at least in part) in the local cache of each of each vault. The host system may be configured for controlling a flow of data to and from each vault. The master core may be configured for distributing to each vault a same relative column of weight matrix data for each of a plurality of gates in the recurrent neural network, based at least in part on instructions from the host system. The plurality of processing cores may be configured for processing each column of weight matrix data in parallel, at each of the respective processing cores.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
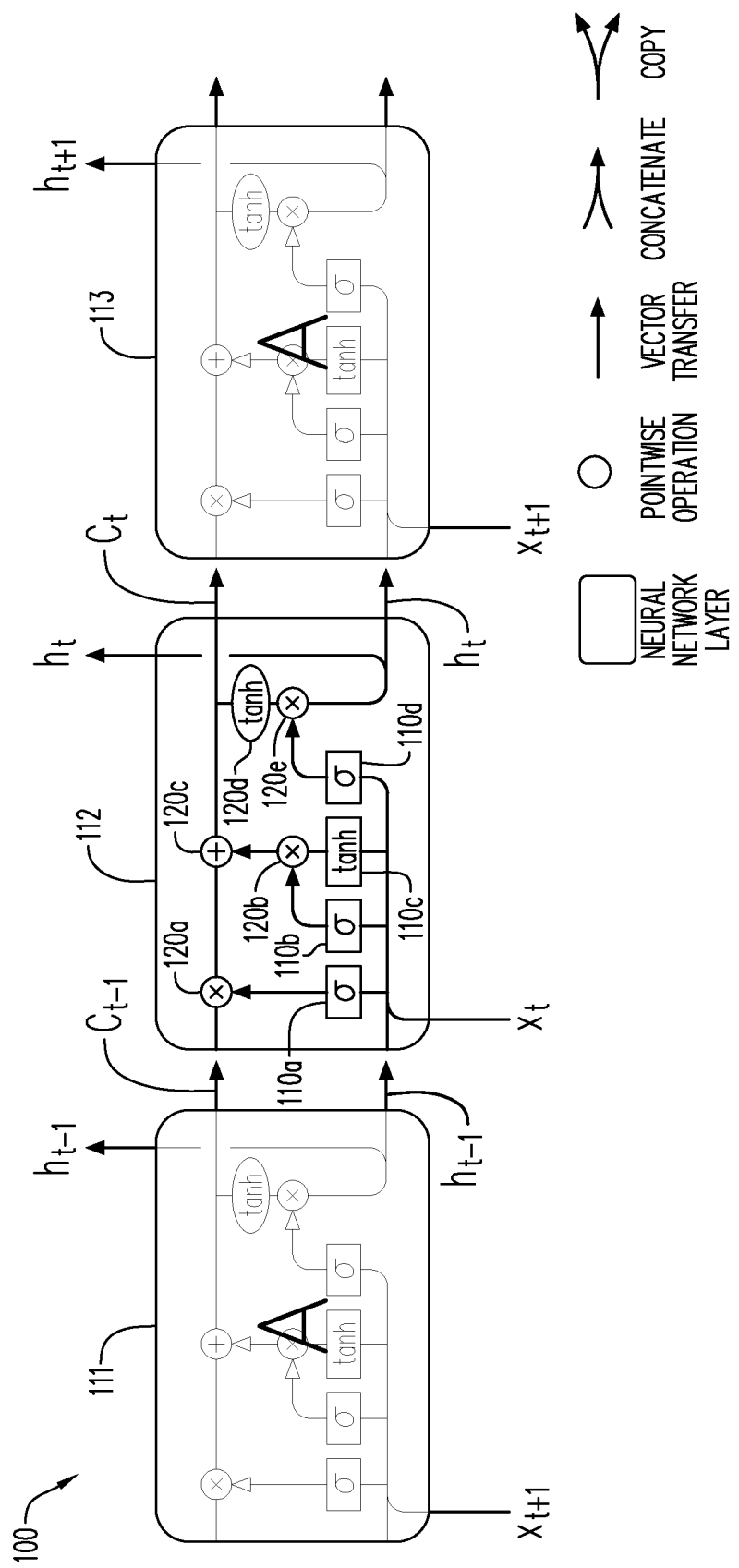
FIG. 1 illustrates an architecture and algorithm for a typical LSTM according to the prior art.

Various features, aspects, and advantages of the embodiments will become more apparent from the following detailed description, along with the accompanying figures in which like numerals represent like components throughout the figures and text. The various described features are not necessarily drawn to scale but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

A typical LSTM architecture and algorithm 100 according to the prior art is shown in FIG. 1, which is taken from the website colah.github.io/posts/2015-08-Understanding-LSTMs/. With reference to FIG. 1, the LSTM algorithm 100, as it is carried out for inference (as opposed to training) at a particular timestep 112 of the LSTM network 100, performs a set of four vector-matrix operations 110a, 110b, 110c, 110d and then a set of pointwise operations 120a, 120b, 120c, 120d, 120e on the resulting vector outputs, as explained in additional detail, below. The four vector-matrix multiplications 110a, 110b, 110c, 110d are referred to as gates, because their goal is to let only the correct/relevant information on to the outputs or next phase of the algorithm. Each gate is associated with and/or includes a vector of values according to a particular operation of the neural network, and the four vectors together make up a weight matrix of the neural network. Certain inputs to the subject timestep 112 are provided by a candidate vector $C_{t-1}$ and an output vector $h_{t-1}$ that capture a past state from a previous timestep 111 of the LSTM network. An input vector $X_t$ to the subject timestep 112 captures the current incoming information to process and is concatenated with the previous output vector $h_{t-1}$. The concatenated vector will serve as an input for the vector-matrix multiplication of each gate 110a, 110b, 110c, 110d. The candidate vector $C_{t-1}$, also referred to as the cell state, persists through the LSTM neural network, including the previous timestep 111, the subject timestep 112 (as $C_t$), and a future timestep 113, and represents preserved information regarding past states and information that has been updated at each timestep 111, 112, 113 of the LSTM network.

With continuing reference to FIG. 1 and the gates 110a, 110b, 110c, 110d, each gate performs, alone or in part, four different responsibilities of memory in the LSTM network: 1) understanding inputs (110a); 2) forgetting old remembered values (110a); 3) computing new candidate information (110b and 110c); and, 4) preparing outputs (110d). The first gate 110a is both an "understand" and a "forget" gate that, first, evaluates the current inputs $X_t$ and, second, determines what, if any, information in the cell state $C_{t-1}$ should be modified based on changing conditions between the previous output $h_{t-1}$ and the current inputs $X_t$. The forget gate portion of 110a is a sigmoid function that outputs a number between 0 and 1 for each corresponding aspect represented as a number in the cell state $C_{t-1}$, where 0 represents "completely get rid of this" while 1 represents "completely keep this." The cell state $C_{t-1}$ is multiplied by the output from the forget gate 110a at the pointwise multiplication operation 120a.

The second gate 110b and the third gate 110c together represent an "input" gate and respectively decide which values of the cell state $C_{t-1}$ to update and create a vector of new candidate values that is added to the state. The second gate 110b is a sigmoid function that again outputs a value between 0 and 1, where, e.g., 0 represents "do not update" while 1 represents "update completely." The third gate 110c is a hyperbolic tangent function (tan h) that outputs values between −1 and 1 representing each candidate value, and the results of the tan h function 110c are multiplied by the output from the sigmoid function 110b, at the pointwise multiplication operation 120b, to scale the degree to which each cell state value is updated. The result of the pointwise multiplication operation 120b is then added to the cell state $C_{t-1}$ (as modified by the forget gate 110a) at pointwise addition operation 120c.

Finally, the LSTM network timestep 112 at the fourth gate 110d determines what to output from the timestep 112. First, a sigmoid function determines what parts of the cell state to output (at $C_t$) based on, for example, the cell state values that have been forgotten and/or updated and the likely functions that may be required by the future timestep 113 as a result. Then, the cell state $C_{t-1}$ (as modified by the previous gates 110a, 110b, 110c) is put through the tan h pointwise function 120d to push the cell state values to between −1 and 1. The output of the tan h pointwise function 120d is multiplied by the output of the sigmoid function at pointwise multiplication operation 120e to create a filtered cell state as output $h_t$ from the subject timestep 112. The full cell state $C_t$ is also output from the subject timestep 112 and each of the cell state $C_t$ and the output $h_t$ serve as state inputs to the future LSTM timestep 113 for similar processing. In addition, output $h_t$ may be provided to a memory core that stores outputs representing past states of the LSTM network.

For purposes of illustrating features of the exemplary embodiments, an example will now be introduced and referenced throughout the disclosure. This example is illustrative and not limiting and is provided purely for explanatory purposes.

Figure 2:
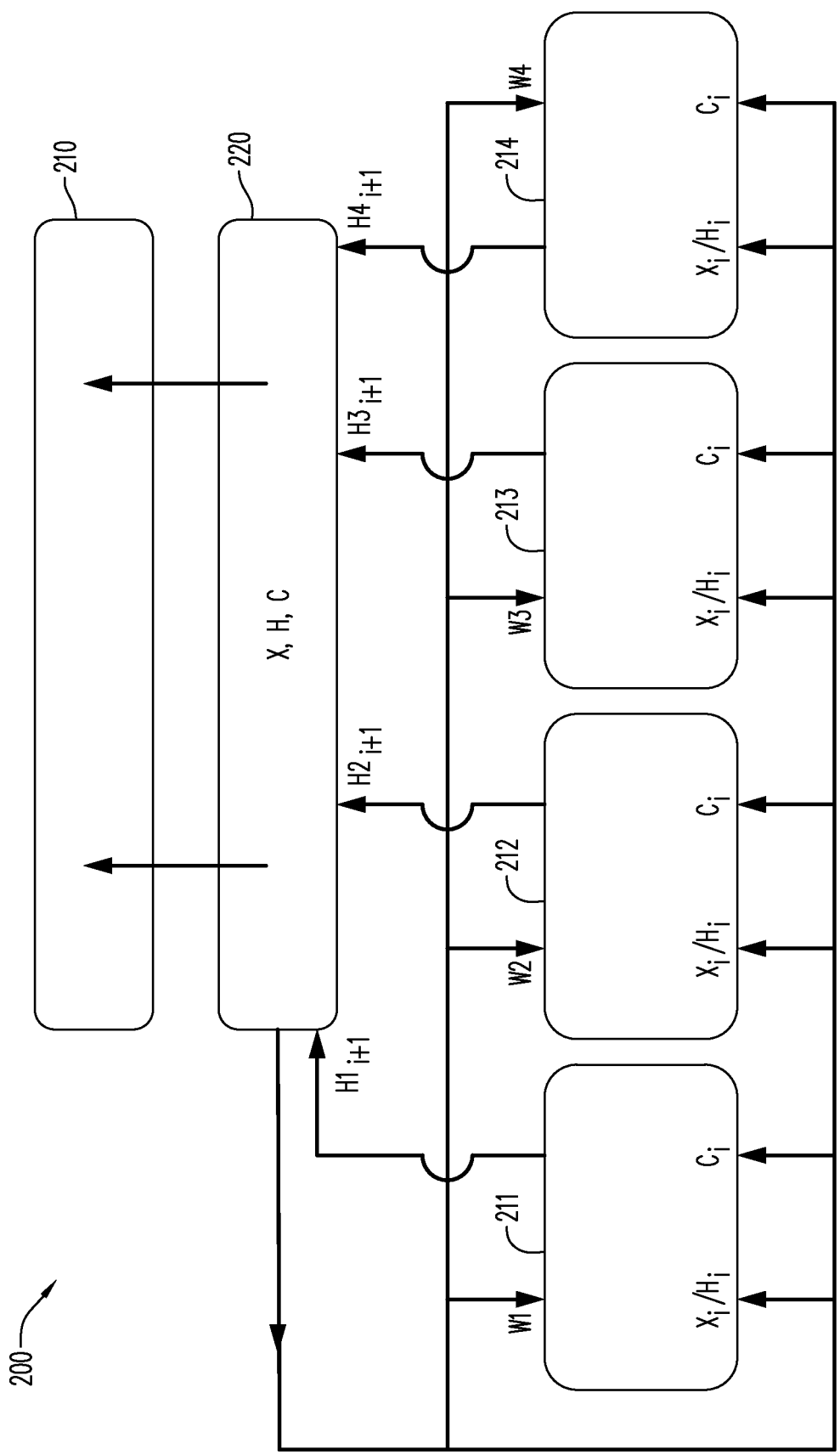
FIG. 2 illustrates an architecture and algorithm for an LSTM according to an exemplary embodiment.

With reference to FIG. 2, an exemplary parallel LSTM network architecture and algorithm 200 according to the disclosure is shown. In the exemplary embodiment shown in FIG. 2, the LSTM 200 may be implemented as, for example and without limitation, a processing chip or integrated circuit, implemented on a host 210 which may be any known computing device consistent with this disclosure. The LSTM 200 includes, among other things, a master core 220 and a plurality of processing cores 211, 212, 213, 214. The master core 220 may be a memory and broadcasting device for broadcasting a current input vector $X_i$ and/or current state vectors $C_i$, $H_i$ to each of the processing cores 211, 212, 213, 214 (the current state vector $H_i$ is computed in parallel during a previous timestep of the algorithm, as described below). In some embodiments, the processing cores may include highly parallel processing logic, such as a Coarse-Grained Reconfigurable Architecture (CGRA). In the same or other embodiments, the processing cores may include a Mixed-Grained Reconfigurable Architecture (MGRA) or other parallel processing logic consistent with this disclosure. In operation, the host system 210 may slice a weight matrix 300 (FIG. 3) including four gate matrices 301, 302, 303, 304 (FIG. 3) into subsets W1, W2, W3, W4 that each include the same relative column from each of the gate matrices 301, 302, 303, 304. Each of the subsets W1, W2, W3, W4 may have a substantially equal number of columns. The host system 210 may then distribute, via the master core 220, each subset W1, W2, W3, W4 to a respective processing core 211, 212, 213, 214. The master core 220 broadcasts a concatenated vector $X_i/H_i$ of the current input $X_i$ and current state $H_i$ to each of the processing cores 211, 212, 213, 214.

Figure 3:
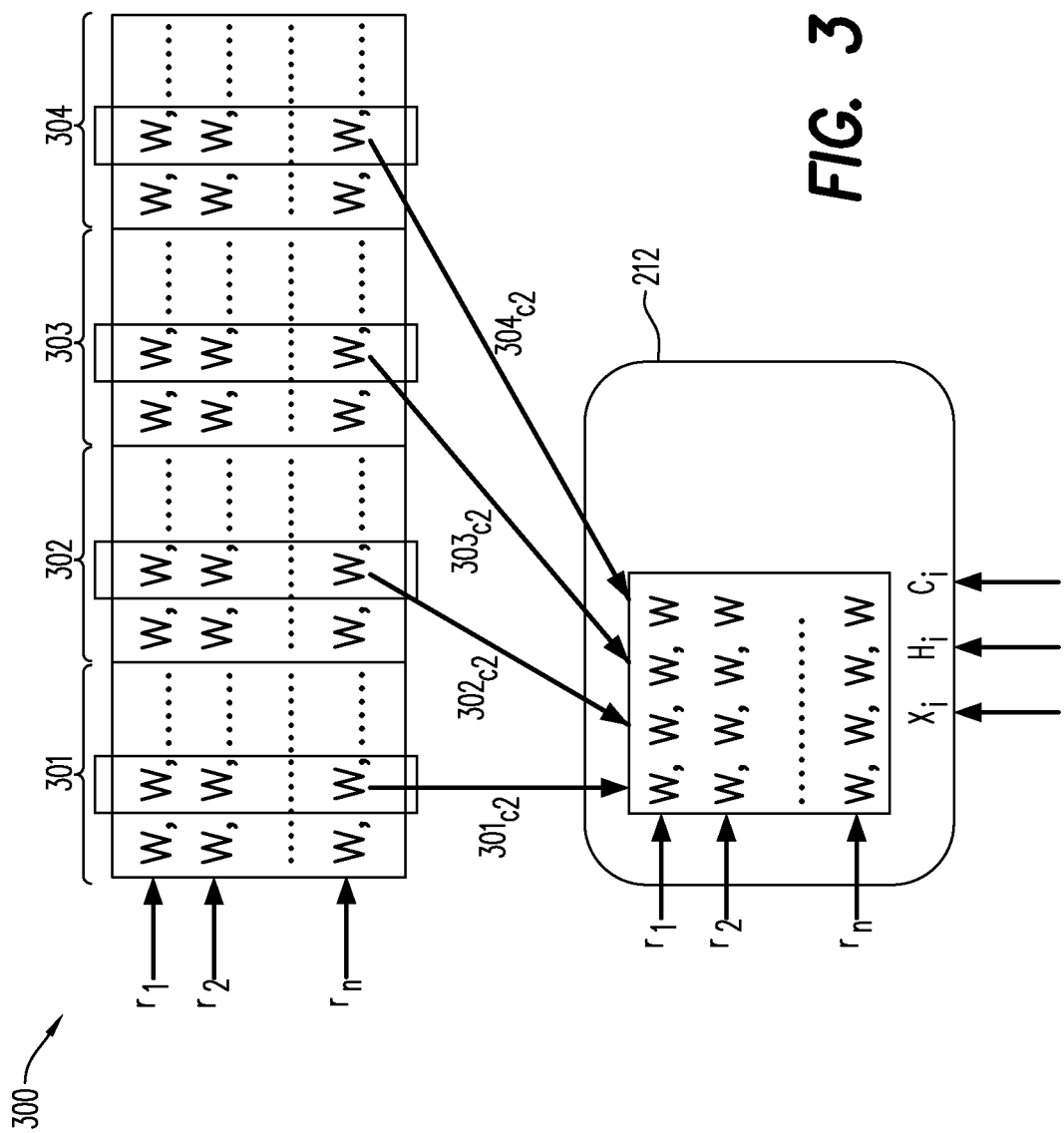
FIG. 3 illustrates an exemplary distribution of weight matrices.

With reference now to FIG. 3, an exemplary distribution of the weight matrix 300 is shown. For demonstration purposes, the input vectors are shown as row vectors. In the example shown in FIG. 3, each row $r_1$, $r_2$, . . . , $r_n$ from a same relative one or more columns $301_{c1}$, $302_{c2}$, $303_{c2}$, $304_{c2}$ of each gate matrix 301, 302, 303, 304 is made available to the processing core 212 along with the concatenated vector $X_i/H_i$ and the current state vector as previously discussed. Each of the other processing cores 211, 213, 214 would similarly receive each row $r_1$, $r_2$, . . . , $r_n$ from a corresponding one or more columns (a slice) of each gate matrix 301, 302, 303, 304. In operation, each of the processing cores 211, 212, 213, 214 may then compute, in parallel, a subset of the matrix multiplication and pointwise operation(s) on each corresponding subset W1, W2, W3, W4 of elements from each gate matrix 301, 302, 303, 304. The parallel computation results in the final computation of fragments of the $C_{i+1}$ vector, which are stored locally at each processing core, and the $H_{i+1}$ vector, which are needed by the processing cores 211, 212, 213, 214 during the next timestep of the algorithm. Accordingly, and with reference back to FIG. 2, the $H_{i+1}$ vector fragments $H1_{i+1}$, $H2_{i+1}$, $H3_{i+1}$, $H4_{i+1}$ are written (i.e., uploaded) to the array controlled by the master core 220 for later broadcast. In some embodiments, the slice of columns loaded into a given processing core represents adjacent columns of the gate matrix, while in other embodiments the slice of columns represents non-adjacent columns. Further, in some embodiments the gate matrices are stored in memory in column-major order, while in other embodiments the gate matrices are stored in row-major order. For example, with four processing cores 211, 212, 213, 214 and with the gate matrices stored in a row-major order, a first processing core 211 would receive the first (consecutive) $\frac{1}{4}^{th}$ of the columns, the second processing core 212 would receive the second (consecutive) $\frac{1}{4}^{th}$ of the columns, the third processing core 213 would receive the third (consecutive) $\frac{1}{4}^{th}$ of the columns, and the fourth processing core 214 would receive the fourth (consecutive) $\frac{1}{4}^{th}$ of the columns.

In the exemplary embodiments, the LSTM 200 is shown with four processing cores 211, 212, 213, 214. In other embodiments, any number of processing cores consistent with this specification may exist, so long as each processing core 211, 212, 213, 214 (assuming processing cores with similar capabilities) is given a roughly equal number of columns from the weight matrix 300 for each gate 301, 302, 303, 304. In other words, for M columns per gate and N processing cores, each processing core would receive roughly M/N columns. Distributing the same relative columns to each processing core 211, 212, 213, 214 allows the pointwise operations to be performed without requiring additional synchronization.

Figure 4:
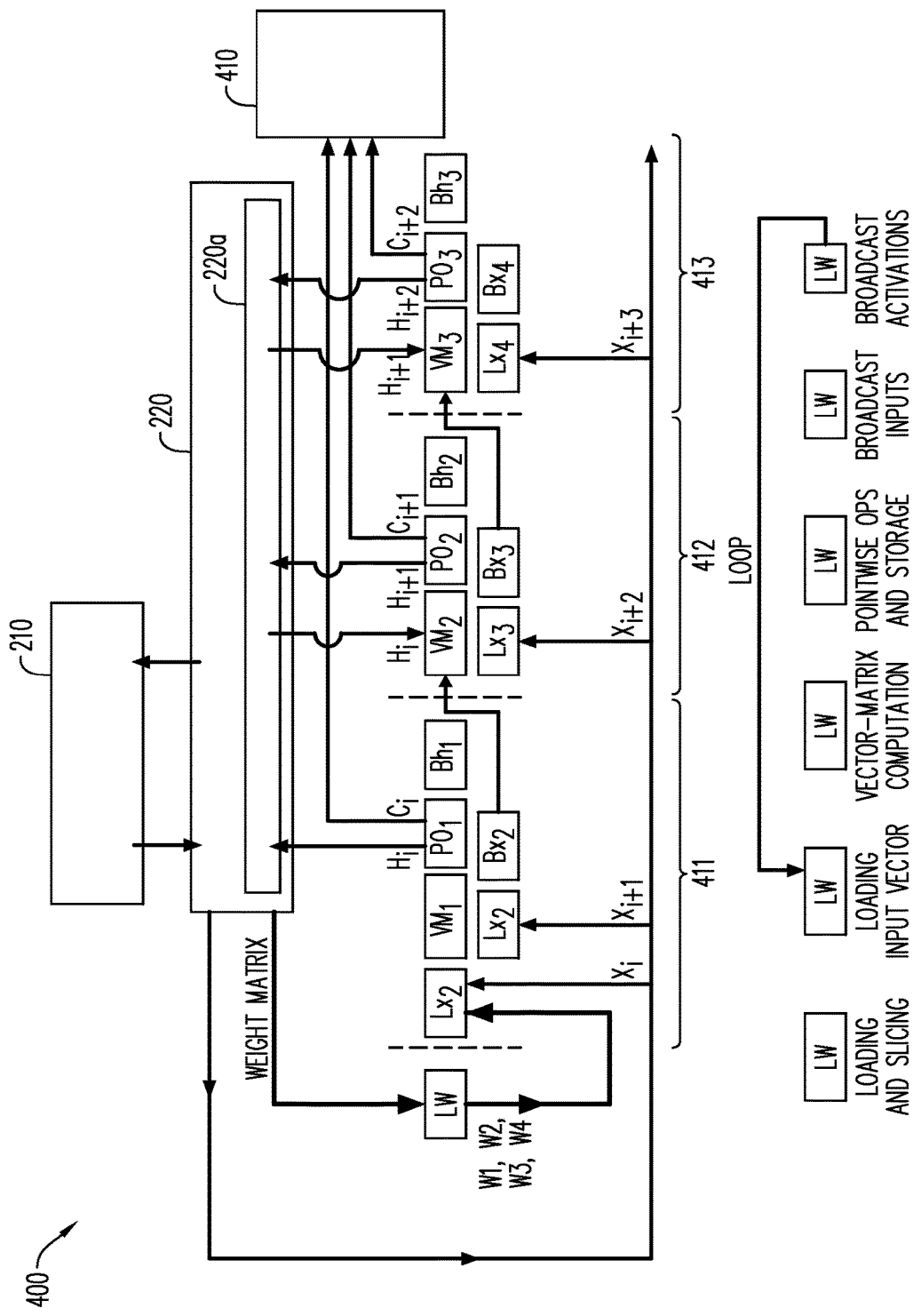
FIG. 4 illustrates an exemplary algorithm for the exemplary LSTM.

With reference now to FIG. 4, a more detailed illustration of the exemplary algorithm 400 is shown according to processing timesteps 411, 412, 413. Before the timestep 411, the weight matrix 300 of the LSTM 200 is sliced into subsets W1, W2, W3, W4, at step LW, and each subset W1, W2, W3, W4 respectively of the weight matrix 300 is preloaded into a processing core (or, in some embodiments, a cache (or alternatively a simple buffer)) 522, 523, 524, 525 (FIG. 5) associated with the processing core, as explained below with respect to FIG. 5). For purposes of this disclosure, a "cache" may refer to a scratchpad (local memory with programmer-controlled allocation) or a traditional cache (local memory with microarchitecture-controlled allocation). In the exemplary embodiment shown in FIG. 5, the set of inputs for an inference problem associated with the algorithm are copied in their entirety to a contiguous location 531, 532, 533, 534, 535 (FIG. 5) corresponding to each processing core 211, 212, 213, 214, as discussed with respect to FIG. 5. In various other embodiments, the weight matrix may be preloaded, in its entirety or in part, into the processing cores. In an exemplary aspect, the weight matrix is preloaded in its entirety. The weight allocation and loading step LW need only be performed once per inference problem, as weights are shared both across timesteps within the same inference and across subsequent inferences. The allocation and loading step LW is a performance-non-critical step that may be performed by the host 210, as described below with respect to FIG. 5.

At a timestep 411, the current input vector $X_i$ is loaded into each processing core at step $Lx_1$. In one aspect, $X_i$ may be concatenated with $H_{i-1}$ (not shown) from, e.g., a previous inference. In another aspect, $X_i$ may be concatenated with a zero vector during an initial timestep. Further, as shown in FIG. 4, the input vector $X_{i+1}$ for the next timestep can be preloaded, at step $Lx_2$, from memory while the current state vectors $C_i$ and $H_i$ are being computed. According to this aspect, an exemplary chip 500 (FIG. 5) according to the disclosure may include a double buffer at each cache 522, 523, 524, 525—one buffer for the current input vector $X_i$ 522a, 523a, 524a, 525a (FIG. 5) and one buffer for the "next" input vector $X_{i+1}$ 522b, 523b, 524b, 525b (FIG. 5) for the next timestep. At the transition between timesteps 411, 412, 413 the "next" 522b, 523b, 524b, 525b and "current" 522a, 523a, 524a, 525a buffers are swapped for all processing cores. A barrier at each transition point may be used to synchronize all processing cores. In the exemplary embodiment, the next input vector $X_{i+1}$ and the computed state vector $H_i$ respectively are multicast from the master core 220 to each processing core, at steps $Bx_2$ and $Bh_1$, which reduces processing overhead by obviating the need for each core to send a request to the master core 220. In the exemplary embodiment, steps $Lx_2$ and $Bx_2$ (and corresponding $Lx_3$, $Bx_3$ and $Lx_4$, $Bx_4$, as discussed below) may be considered as part of the same phase, because they operate in lockstep as the master core 220 performs a standard memory load of the next input vector $X_{i+1}$ and then uses a broadcast (e.g., a cache that stores and forwards information) to broadcast the data into the next input buffer 522b, 523b, 524b, 525b of each processing core.

With continuing reference to FIG. 4, at the timestep 411, processing at each core proceeds as described above with respect to FIGS. 1-3. The vector-matrix multiplications for each gate are performed at step $VM_1$ and the pointwise operations are performed at step $PO_1$. The resulting computed state vector $C_i$ is written to a local memory 410 and the computed output (state) vector $H_i$ is written to a "next" output (state) buffer 220a of the master core 220, for use in further timesteps. At step $Bh_1$, the next output (state) vector $H_i$ is multicast to the processing cores for use in the subsequent timestep. It will be understood that, depending on the capabilities of the processing cores, the steps may all be performed sequentially, or various of these steps may overlap in their execution. For example, step PO1 may execute as outputs are produced from step VM1. Similarly, the processing cycle at the timestep 412 uses input vector $X_{i+1}$ and output (state) vector $H_i$ for performing the same processing steps, including vector-matrix multiplication at step $VM_2$ and pointwise operations at step $PO_2$, while the next input vector $X_{i+2}$ is loaded into the next input buffer at step $Lx_3$. As previously described, the next input vector is multicast to all processing cores, as indicated by step $Bx_3$. The resulting computed state vector $C_{i+1}$ is written to the local memory 410 and the computed output (state) vector $H_{i+1}$ is written to the next output (state) buffer 220a of the master core 220. At step $Bh_2$, the next output (state) vector $H_{i+1}$ is multicast to the processing cores. At the timestep 413, the process continues with the vector-matrix multiplication $VM_3$ and pointwise operations $PO_3$ based on vector input $X_{i+2}$ and computed (output) state vector $H_{i+1}$. Input vector $X_{i+3}$ is preloaded into the next input buffer at step $Lx_4$ and broadcast to the processing cores at step $Bx_4$. Once again, the resulting computed state vector $C_{i+2}$ is written to the local memory 410 and the computed output (state) vector $H_{i+2}$ is written to the next output (state) buffer 220a of the master core 220 for broadcast to the processing cores. At each timestep, the master core 220 waits until it receives the partial outputs ($H_i$) from all cores before performing the broadcast. In some embodiments, the master core 220 may use a barrier to synchronize the operation. The process continues in this fashion for as many timesteps are required for the particular inference operation.

In further aspects of the exemplary algorithm depicted in FIG. 4, each processing core maintains its own input ($X_i$), state ($C_i$), and output (state) ($H_i$) vectors corresponding to its distributed weight columns. The host 210 allocates the per-core memory (as described below with respect to FIG. 5) for such storage. While the exemplary embodiment includes a double buffer 522a, 523a, 524a, 525a/522b, 523b, 524b, 525b at every processing core cache 522, 523, 524, 525 for current $X_i$ and next $X_{i+1}$ input vectors, each cache needs only one buffer for output (state) $H_i$ values because each processing core independently enforces the dependence between current and next values using barrier synchronization. Similarly, for each state vector $C_i$, the dependence between timesteps is enforced naturally by the processing/computation, so each processing core needs only one buffer for its state vector $C_i$. The master core 220, on the other hand, receives the values for the next output (state) vector $H_i$ while it is performing synchronization, so the master core 220 includes the next buffer 220a for the next output (state) vector $H_i$.

Figure 5:
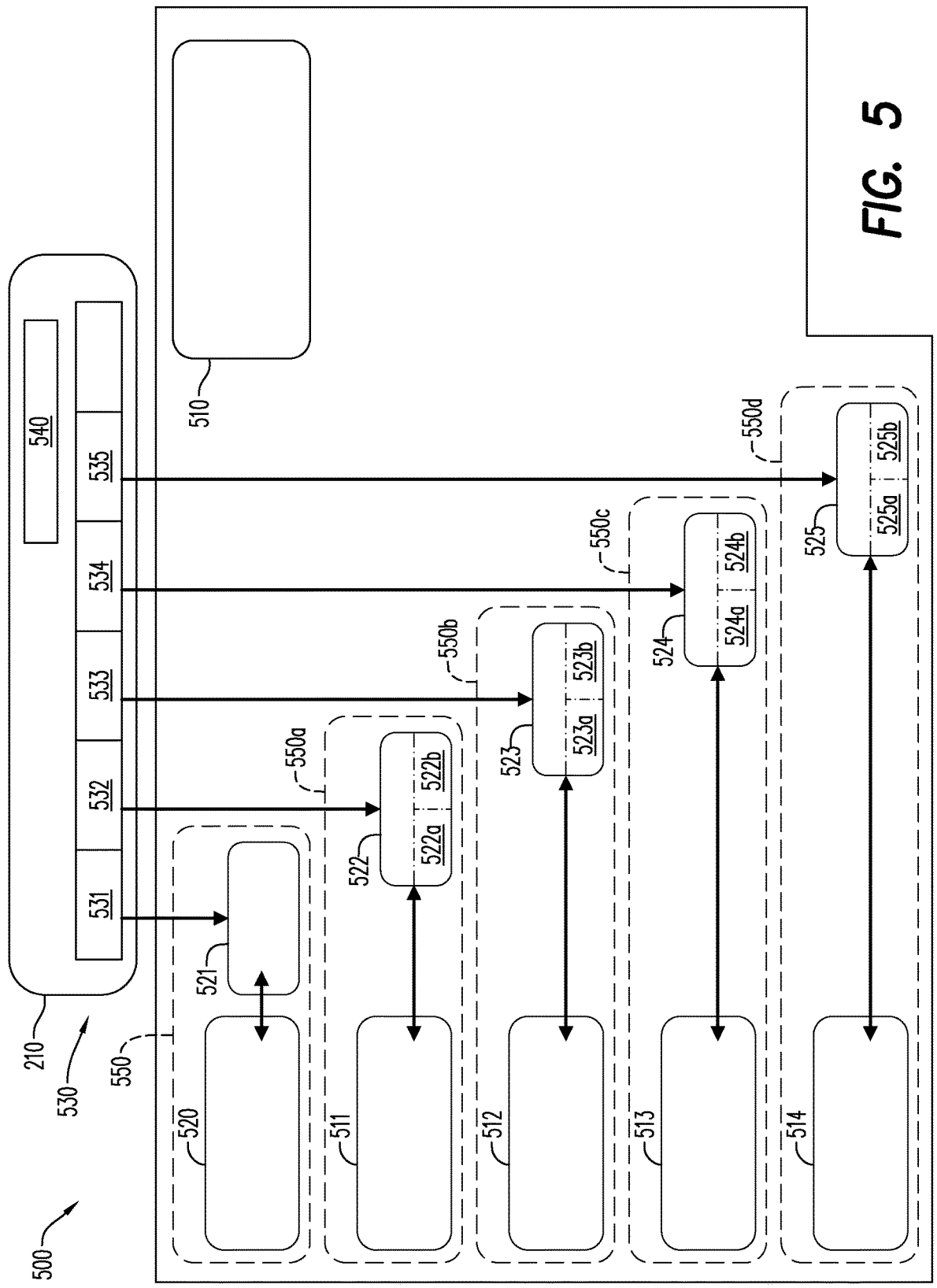
FIG. 5 illustrates an exemplary chip architecture for the exemplary LSTM.

With reference now to FIG. 5, an exemplary architecture for the chip 500 on which the LSTM 200 is implemented is shown. The chip includes, among other things, a master core 520, a plurality of processing cores 511, 512, 513, 514, a physical memory 510, and a plurality of local caches 521, 522, 523, 524, 525, wherein each local cache is respectively assigned to the master core 520 or a processing core 511, 512, 513, 514. As previously discussed with respect to FIG. 4, the local cache 522, 523, 524, 525 of each processing core 511, 512, 513, 514 may be a double-buffered cache, and may include assigned storage locations for the current input vector $X_i$ and the next input vector $X_{i+1}$. For example, local cache 522, 523, 524, 525 may include the current input buffer 522a, 523a, 524a, 525a for the current input vector $X_i$ and the next input buffer 522b, 523b, 524b, 525b for the next input vector $X_{i+1}$. In the exemplary embodiment, the physical memory 510 of the chip maintains correspondence with a portion of a virtual address space 530 on the host 210, wherein data transfers between the physical memory 510 and the virtual address space 530 on the host 210 are initiated by the host 210. Further, the master core 520 and each of the processing cores 511, 512, 513, 514 is assigned a contiguous region 531, 532, 533, 534, 535 of the virtual address space 530, and that region is stored on the corresponding local cache 521, 522, 523, 524, 525 of the master core 520 and each processing core 511, 512, 513, 514. As such, the master core 520 and each processing core 511, 512, 513, 514 uses the data allocated to its particular address range 521, 522, 523, 524, 525. The combination of a processing core and a local cache is referred to herein as a "vault" 550, 550a, 550b, 550c, 550d (for brevity for purposes of this disclosure, reference to a "vault 550" refers to all vaults that may be present, including, e.g., 550, 550a, 550b, 550c, and 550d). In certain embodiments, multiple processing cores may be assigned to the same vault 550.

With continuing reference to FIG. 5, the exemplary chip 500 may be connected to a Central Processing Unit (CPU) 540 of the host. The CPU 540 may perform performance-non-critical tasks such as the allocation and loading step LW (FIG. 4), coarse grain memory allocation among vaults, initialization and coordination of parallel tasks, and phases of the algorithm. The host CPU 540 is also responsible for pushing and pulling relevant data to the vaults 550. Other components that the exemplary chip 500 may include are, without limitation, a broadcast mechanism for multicasting replicated data across processing elements of the chip 500, a barrier mechanism for forcing synchronization of the parallel computing operations, one or more scratchpad memories or circuits for improving cache bandwidth by, e.g., storing weights (across batch elements) or inputs (across columns) for reuse, debugging facilities, and other known facilities, functions, and mechanisms consistent with this disclosure.

In further aspects of the exemplary embodiments for, e.g., handling relatively large inputs, the host 210 may stream inputs to the master core 220 in a manner that is synchronized with the progress of the exemplary algorithm and the demand for additional inputs. In the same or other embodiments, the exemplary LSTM 200 may include two or more master cores wherein, for example, the operations of synchronizing output (state) vectors $H_i$ and broadcasting input vectors $X_i$ are decoupled and handled by different master cores. The master core dedicated to broadcasting the inputs may also be rotated among processing cores 211, 212, 213, 214 throughout the course of the algorithm.

In additional aspects of the exemplary embodiment, certain techniques may be implemented to reduce broadcast latency and the impact on bandwidth across the chip 500. In a first technique, if the inputs are small enough, data may be duplicated for one or more groups of processing cores and the inputs broadcast only to processing cores within a particular group. Such a technique is described in commonly-owned U.S. Patent Application No. 62/781,644 filed on Dec. 19, 2018, which is incorporated herein by reference in its entirety. In such a technique, trail-buffer simultaneous read-reuse mechanisms become relevant, which has the additional benefit of obviating a double-buffered cache 522, 523, 524, 525 for the current input vector $X_i$ and the next input vector $X_{i+1}$. In the same or other embodiments, each processing core 211, 212, 213, 214 may directly broadcast its output $H_i$ to all other processing cores using a prethrow interface. The prethrow interface technique may eliminate the step of writing the outputs $H_i$ to the master core 220 and the barrier synchronization delay prior to broadcasting the outputs Hi at step $Bh_i$.

Figure 6:
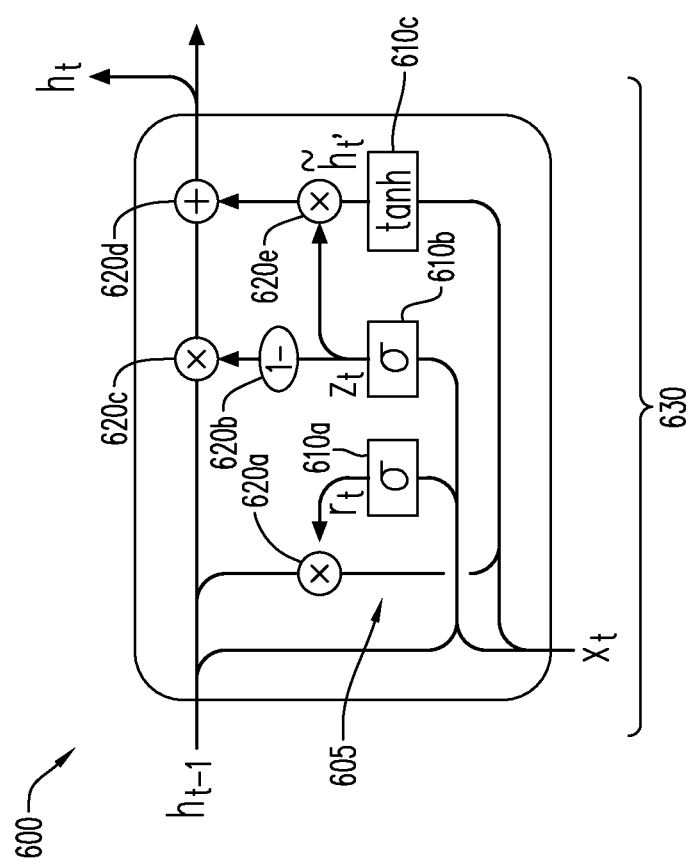
FIG. 6 illustrates an architecture and algorithm for a GRU according to an exemplary embodiment.

With reference now to FIG. 6, one timestep 630 of an exemplary Gated Recurrent Unit (GRU) 600 according to the disclosure is shown in isolation. A GRU generally is similar to an LSTM, one difference being that for each timestep 630 of the GRU an additional feedback loop 605 including a sigmoid function at a first gate 610a and a pointwise multiplication 620a is required. Without the additional feedback loop 605, the algorithm for the exemplary LSTM embodiments described above can be implemented directly. The GRU 600 also requires additional communication capacities for assembling and distributing the information $r_t$ from the feedback loop 605. The additional capacities may be a prethrow feature as discussed above.

With continuing reference to FIG. 6, the algorithm for one timestep 630 in the exemplary GRU 600 begins, similar to the timesteps 411, 412, 413, by distributing a weight matrix to a plurality of processing cores (not shown). An input vector $x_t$ and a state vector $h_{t-1}$ are concatenated and the result is provided to a first gate 610a and a second gate 610b which are sigmoid functions. The information $r_t$ from the first sigmoid function 610a is provided to the pointwise multiplication 620a along with the state vector $h_{t-1}$. The result of the pointwise multiplication 620a between the state vector $h_{t-1}$ and the information $r_t$ from the first sigmoid function 610a is then concatenated with the input vector $x_t$ and the result is provided to a third gate 610c which is a tan h function.

The result $z_t$ of the sigmoid function of the second gate 610b is input into a Rectified Linear Unit (ReLU) 620b that thresholds at zero the values of the vector $z_t$, by replacing negative values with zero. The result of the ReLU is then provided as an input into a pointwise multiplication operation 620c, along with state vector $h_{t-1}$. The result of the multiplication operation 620c is subsequently input into a pointwise addition operation 620d, along with the result of a pointwise multiplication operation 620e on an output vector $h_{t'}$ of the tan h function of the fourth gate 610c.

The input to the tan h function of the fourth gate 610c is the concatenation of the input vector $x_t$ and the feedback loop 605. The output vector $h_{t'}$ of the tan h function is input into the pointwise multiplication operation 620e, along with the output vector $z_t$ of the sigmoid function of the second gate 610b. The result of the pointwise multiplication operation 620e is then provided to the pointwise addition operation 620d, along with the state vector $h_{t-1}$. The result of the pointwise addition operation 620d is output as a partial state vector $h_t$, thus ending the timestep 630.

In another aspect of the exemplary GRU algorithm 600, the respective sigmoid functions of the first gate 610a and the second gate 610b may be calculated simultaneously and the tan h function may be calculated after obtaining the result from the feedback loop 605. In a further aspect of the exemplary GRU algorithm 600, the feedback loop 605 and the sigmoid function of the second gate 610b ReLU 620b pointwise multiplication operation 620c path may proceed in parallel.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method of accelerating a recurrent neural network, the method comprising:
   distributing from a first master core to each of a plurality of processing cores a same relative one or more columns of weight matrix data for each of a plurality of gates in the recurrent neural network;
   broadcasting a current input vector from the first master core to each of the processing cores;
   processing each column of weight matrix data in parallel, at each of the respective processing cores, and concatenating the current input vector with a state vector; wherein processing includes performing at least one of a vector-matrix multiplication of the weight matrix data and the concatenated vector and a pointwise operation on a result of the vector-matrix multiplication.

2. The method of claim 1, wherein the neural network is a long short-term memory (LSTM) neural network or a Gated Recurrent Unit (GRU) neural network.

3. The method of claim 1, wherein distributing the weight matrix data includes preloading an entire weight matrix data into the processing cores.

4. The method of claim 1, wherein processing includes performing at least one of a vector-matrix multiplication of the weight matrix data and the current input vector and a pointwise operation on a result of the vector-matrix multiplication.

5. The method of claim 4, further comprising loading a next input vector into each processing core while the processing core is processing the weight matrix data.

6. The method of claim 1, wherein each processing core is assigned a contiguous region of an overall addressable storage space of a system host, and the addressable storage space of each processing core is stored in the local cache of the respective processing core.

7. The method of claim 1, wherein processing the weight matrix data at each processing core produces a candidate vector data fragment and an output vector data fragment from each processing core.

8. The method of claim 7, further comprising writing each output vector data fragment to the first master core.

9. The method of claim 8, further comprising broadcasting the respective output vector data fragments from the master core to the corresponding processing cores, wherein each output vector data fragment is a state input vector fragment for the processing core in a next timestep of the recurrent neural network.

10. The method of claim 9, further comprising broadcasting a current input vector for the next timestep to each processing core.

11. The method of claim 7, further comprising storing each candidate vector data fragment in a local memory.

12. The method of claim 1, wherein each processing core receives a substantially equal number of columns as the other processing cores.

13. The method of claim 1, wherein one or more processing cores includes at least one of a Coarse-Grained Reconfigurable Array (CGRA) and a Mixed-Grained Reconfigurable Array (MGRA).

14. The method of claim 1, further comprising repeating the broadcasting of the current input vector and the processing of each of the columns of weight matrix data in parallel for multiple input vectors.

15. A processor configured for accelerating a recurrent neural network, the processor comprising:
   a first master core and a plurality of processing cores, wherein
   the first master core is configured for broadcasting to each processing core a current input vector and distributing to each processing core a same relative column of weight matrix data for each of a plurality of gates in the recurrent neural network,
   the first master core is configured for broadcasting to each processing core a concatenated vector of the current input vector with a state vector;
   the plurality of processing cores is configured for processing each column of weight matrix data in parallel, at each of the respective processing cores, the processing including performing at least one of a vector-matrix multiplication of the weight matrix data and the concatenated vector and a pointwise operation on a result of the vector-matrix multiplication.

16. The processor of claim 15, further comprising a second master core, wherein the first master core and the second master core are configured for alternatingly broadcasting a current input vector for a first timestep of the recurrent neural network and a next input vector for a next timestep of the recurrent neural network.

17. The processor of claim 15, wherein each of the processing cores includes a local cache having assigned storage locations for the current input vector and a next input vector.

18. A system configured for accelerating a recurrent neural network, the system comprising:
   a host system;
   a processor including a master core and a plurality of processing cores;
   a plurality of data vaults, wherein each data vault includes a local cache and the master core or the processing core to which the local cache is assigned; and,
   an interface for maintaining data communication between the processor and the host system, wherein
      each vault is assigned to a contiguous region of an addressable storage space of the host system, and the contiguous region of the addressable storage space for each vault is stored in the local cache of each of each vault,
      the host system is configured for controlling a flow of data to and from each vault,
      the master core is configured for broadcasting to each vault a current input vector and, distributing to each vault a same relative column of weight matrix data for each of a plurality of gates in the recurrent neural network, based at least in part on instructions from the host system,
   the master core is configured for broadcasting to each vault a concatenated vector of the current input vector with a state vector, and
   the plurality of processing cores is configured for processing each column of weight matrix data in parallel, at each of the respective processing cores, the processing including performing at least one of a vector-matrix multiplication of the weight matrix data and the concatenated vector and a pointwise operation on a result of the vector-matrix multiplication.

19. The system of claim 18, wherein the host system is configured for slicing the weight matrix data into subsets including the same relative column of weight matrix data for each of the plurality of gates.

* * * * *